(12) United States Patent
Tanikawa

(10) Patent No.: US 6,212,141 B1
(45) Date of Patent: Apr. 3, 2001

(54) INFORMATION RECORDING APPARATUS AND METHOD

(75) Inventor: Toshiro Tanikawa, Tokorozawa (JP)

(73) Assignee: Pioneer Electronic Corporation, Tokyo-to (JP)

(*) Notice: Subject to any disclaimer, the term of this patent is extended or adjusted under 35 U.S.C. 154(b) by 0 days.

(21) Appl. No.: 09/251,740

(22) Filed: Feb. 18, 1999

(30) Foreign Application Priority Data

Feb. 19, 1998 (JP) .................................................. 10-037721

(51) Int. Cl.$^7$ ............................................... G11B 15/52
(52) U.S. Cl. ..................... 369/47.31; 369/32; 369/53.37; 711/111
(58) Field of Search .............................. 369/47.31, 47.12, 369/47.13, 47.15, 47.16, 59.13, 53.37; 711/111

(56) References Cited

U.S. PATENT DOCUMENTS 5,940,853 * 6/2000 Ooi et al. ............................. 711/111
6,078,559 * 6/2000 Taakemuraa et al. ............. 369/58 X
6,137,769 * 10/2000 Sawada et al. ................... 369/275.3

* cited by examiner

Primary Examiner—Aristotelis M. Psitos
(74) Attorney, Agent, or Firm—Morgan, Lewis & Bockius LLP (57) ABSTRACT

An information recording apparatus initializes an information record medium of repeatedly recordable type, on which at least a lead in area and a data area following the lead in area are assigned in accordance with a predetermined format, and records record information onto the initialized information record medium, and further records the record information onto the initialized and recorded information record medium. The record information comprises data information in the data area as main portion of the record information to be recorded and control information in the lead in area for controlling recording and reproducing operation of the data information. The control information includes a last recorded address indicating an address in the data area of a last portion of the data information which is previously recorded by the recording operation. The information recording apparatus is provided with a controlling device for controlling a writing device to write a predetermined address smaller than a head address of the data area as the last recorded address into the lead in area as one portion of the control information when initializing the information record medium.

12 Claims, 5 Drawing Sheets

INFORMATION RECORDING APPARATUS AND METHOD

BACKGROUND OF THE INVENTION

1. Field of the Invention

The present invention generally relates to an information recording apparatus for recording record information onto a record medium of repeatedly rewritable type (which is referred to as a "DVD-RW") as one of record mediums of high density recording types, which are represented by a DVD and in which the recording densities are drastically improved as compared with a CD (Compact Disc) or the like.

2. Description of the Related Art

There is a standard for the DVD, which is capable of not only recording but also reproducing the record information along with the enlargement of the application field of the DVD. For example, there are a DVD-R (DVD-Recordable), which is capable of recording the record information just once, and the DVD-RW, which is capable of reading and writing many times. From among those, the DVD-RW is capable of rewriting the data again and again at the same area on the disc by use of the phase change of the recording material. Thus, the DVD-RW has possibilities of applications in various fields such as a usage for recording the video and audio information, a usage for an external memory of the computer and so on.

When actually rewriting data repeatedly on the DVD-RW, it is necessary to record new data in accordance with a predetermined format in consideration of the characteristics etc., of the record medium. Namely, in case of firstly recording one data onto the disc in a non-recorded condition and in case of rewriting another data onto the recorded disc, the writing process is started after the initializing process of the disc is once performed.

In the initializing process for the DVD-RW, the information record surface is divided sequentially into the lead in area, the data area and the lead out area. The lead in area and the lead out area are respectively prepared for indicating the start of the data and the end of the data. Various additional information is recorded on the lead in area. The data area is an area where the data corresponding to the contents is actually recorded. Pits are formed by recording the zero data in case of the initialization since a mirror surface condition in which no pits exists causes an erroneous operation because a time difference method of identifying a phase difference of the reflection light component of the pit is employed for the tracking control in the reproducing apparatus.

However, in case of performing the initializing process with respect to the DVD-RW, it does not take much time to perform the initializing process for the lead in area and the lead out area since the information amount to be recorded therein is little, while it takes much time to write the zero data onto the data area. Namely, since the data area is an area where the data having an enormous data size is recordable, it is very difficult to shorten the time for writing the zero data having the enormous data size. As a result, when the new contents are recorded onto the DVD-RW, it takes much time to perform the initializing process, so that the actual recording process for the data cannot be immediately performed.

SUMMARY OF THE INVENTION

It is therefore an object of the present invention to provide an information recording apparatus and an information recording method, which can shorten the time to perform the initializing process for the record medium capable of repeatedly recording the record information.

The above object of the present invention can be achieved by an information recording apparatus for initializing an information record medium of repeatedly recordable type, on which at least a lead in area and a data area following the lead in area are assigned in accordance with a predetermined format, and recording record information onto the initialized information record medium, and further recording the record information onto the initialized and recorded information record medium, the record information comprising data information in the data area as main portion of the record information to be recorded and control information in the lead in area for controlling recording and reproducing operation of the data information, the control information including a last recorded address indicating an address in the data area of a last portion of the data information which is previously recorded by the recording operation. The information recording apparatus is provided with: a writing device for writing the data information into the data area and the control information into the lead in area; and a controlling device for controlling the writing device to write a predetermined address smaller than a head address of the data area as the last recorded address into the lead in area as one portion of the control information when initializing the information record medium, and to write the data information into the data area and the last recorded address into the lead in area as one portion of the control information when recording the record information.

According to the information recording apparatus of the present invention, when initializing the information record medium, under the control of the controlling device, the writing device writes the predetermined address smaller than the head address of the data area as the last recorded address into the lead in area. This predetermined address smaller than the head address is set in advance. When recording the record information onto the initialized information record medium or the initialized and recorded information record medium, the writing device writes the data information into the data area and also writes the last recorded address into the lead in area. Thus, the last recorded address is supposed to be not smaller than the head address of the data area as long as the recording process is appropriately performed. Accordingly, by reading the last recorded address in the lead in area of the information record medium, which has been appropriately initialized, it is possible to judge that no data information is recorded in the data area if the last recorded address is the predetermined value smaller than the head address i.e., different from any possible address in the data area. Therefore, it is possible to prevent the data information in the data area from being erroneously reproduced. Further, it is possible to omit the process of writing the zero data into the data area along with the initializing process as in the case of the aforementioned related art, and it is possible to shorten the time required for the initializing process.

In one aspect of the information recording apparatus of the present invention, the information recording apparatus is further provided with: a reading device for reading the control information from the lead in area when recording the record information onto the initialized information record medium; and a judging device for judging whether or not the last recorded address included in the read control information is smaller than the head address, the controlling device calculates the last recorded address on the basis of a data size of the data information to be recorded, and controls the writing device to write the calculated last recorded address into the lead in area as one portion of the control information if the last recorded address included in the read control information is judged to be smaller than the head address.

According to this aspect, when recording the record information onto the initialized information record medium, the control information, which has been written in the initializing process, is read from the lead in area by the reading device. Then, it is judged by the judging device whether or not the last recorded address included in the read control information is smaller than the head address. Then, if the last recorded address included in the read control information is judged to be smaller than the head address, it can be judged that the initializing process, the reading process and so forth are appropriately performed. Thus, the recording operation is carried on. Namely, the last recorded address is calculated by the controlling device on the basis of the data size of the data information to be recorded. Then, under the control of the controlling device, the writing device writes the calculated last recorded address into the lead in area, which can be used in the next recording operation. Thus, the last recorded address is updated on the basis of the data size to be recorded. Accordingly, it is possible to repeatedly record the record information in an appropriate format.

In this aspect, the controlling device may perform a predetermined error process if the last recorded address included in the read control information is judged to be not smaller than the head address.

In this case, the last recorded address included in the read control information is judged to be not smaller than the head address, it can be judged that the initializing process, reading process and so forth are not appropriately performed. Thus, the predetermined error process is performed by the controlling device. Accordingly, it is possible to prevent the record information from being erroneously recorded, and it is possible to certainly perform the initializing process before the recording process in the repeatedly recording processes.

In this aspect alternatively, the controlling device may control the writing device to write the data information from the head address of the data area if the last recorded address included in the read control information is judged to be smaller than the head address.

In this case, if the last recorded address included in the read control information is judged to be smaller than the head address, under the control of the control device, the writing device writes the data information from the head address of the data area. Accordingly, it is possible to start the recording operation from the head address of the empty data area. It is also possible to start any address in the data area where the data information has never been recorded or has been already recorded. Such an address for starting the recording operation can be specified by the user.

In another aspect of the information recording apparatus of the present invention, the information recording apparatus is further provided with a reading device for reading the control information from the lead in area when recording the record information onto the initialized and recorded information record medium, the controlling device controlling the writing device to write the data information into the data area from an address after the last recorded address included in the read control information.

According to this aspect, when recording the record information onto the initialized and recorded information record medium, the control information is read from the lead in area by the reading device. Then, under the control of the controlling device, the writing device writes the data information into the data area from the address after the last recorded address included in the read control information. Accordingly, it is possible to start the recording operation from the address after the last recorded address. It is also possible to start any address in the data area where the data information has never been recorded or has been already recorded.

In another aspect of the information recording apparatus of the present invention, the information record medium comprises a DVD Rewritable, and the controlling device controls the writing device to write the predetermined address smaller than 30000 (hexadecimal) as the last recorded address.

According to this aspect, under the control of the controlling device, the writing device writes the predetermined address smaller than 30000 (hexadecimal) as the last recorded address in the lead in area of the DVD Rewritable.

Accordingly, even in the DVD-RW which can be used for various usage since it has a very large recording capacity, the time required for the initializing process can be shortened.

An information recording method of initializing an information record medium of repeatedly recordable type, on which at least a lead in area and a data area following the lead in area are assigned in accordance with a predetermined format, and recording record information onto the initialized information record medium, and further recording the record information onto the initialized and recorded information record medium, the record information comprising data information in the data area as main portion of the record information to be recorded and control information in the lead in area for controlling recording and reproducing operation of the data information, the control information including a last recorded address indicating an address in the data area of a last portion of the data information which is previously recorded by the recording operation. The information recording method is provided with: a writing process of writing the data information into the data area and the control information into the lead in area; and a controlling process of controlling the writing process to write a predetermined address smaller than a head address of the data area as the last recorded address into the lead in area as one portion of the control information when initializing the information record medium, and to write the data information into the data area and the last recorded address into the lead in area as one portion of the control information when recording the record information.

According to the information recording method of the present invention, in the same manner as the above described information recording apparatus of the present invention, it is possible to prevent the data information in the data area from being erroneously reproduced. Further, it is possible to omit the process of writing the zero data into the data area along with the initializing process as in the case of the aforementioned related art, and it is possible to shorten the time required for the initializing process.

In one aspect of the information recording method of the present invention, the method is further provided with: a reading process of reading the control information from the lead in area when recording the record information onto the initialized information record medium; and a judging process of judging whether or not the last recorded address included in the read control information is smaller than the head address, the controlling process calculates the last recorded address on the basis of a data size of the data information to be recorded, and controls the writing process to write the calculated last recorded address into the lead in area as one portion of the control information if the last recorded address included in the read control information is judged to be smaller than the head address.

According to this aspect, since the last recorded address is updated on the basis of the data size to be recorded, it is possible to repeatedly record the record information in an appropriate format.

In this aspect, the controlling process may perform a predetermined error process if the last recorded address included in the read control information is judged to be not smaller than the head address.

According to this aspect, it is possible to prevent the record information from being erroneously recorded, and it is possible to certainly perform the initializing process before the recording process in the repeatedly recording processes.

In this aspect alternatively, the controlling process may control the writing process to write the data information from the head address of the data area if the last recorded address included in the read control information is judged to be smaller than the head address.

According to this aspect, it is possible to start the recording operation from the head address of the empty data area. In another aspect of the information recording method of the present invention, the method is further provided with a reading process of reading the control information from the lead in area when recording the record information onto the initialized and recorded information record medium, the controlling process controlling the writing process to write the data information into the data area from an address after the last recorded address included in the read control information.

According to this aspect, it is possible to start the recording operation from the address after the last recorded address.

In another aspect of the information recording method of the present invention, the information record medium comprises a DVD Rewritable, and the controlling process controls the writing process to write the predetermined address smaller than 30000 (hexadecimal) as the last recorded address.

Accordingly, even in the DVD-RW which can be used for various usage since it has a very large recording capacity, the time required for the initializing process can be shortened.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Referring to the accompanying drawings, an embodiment of the present invention will be now explained. In the embodiment, the present invention is applied to an information recording apparatus for recording digital data onto a DVD-RW.

Figure 1:
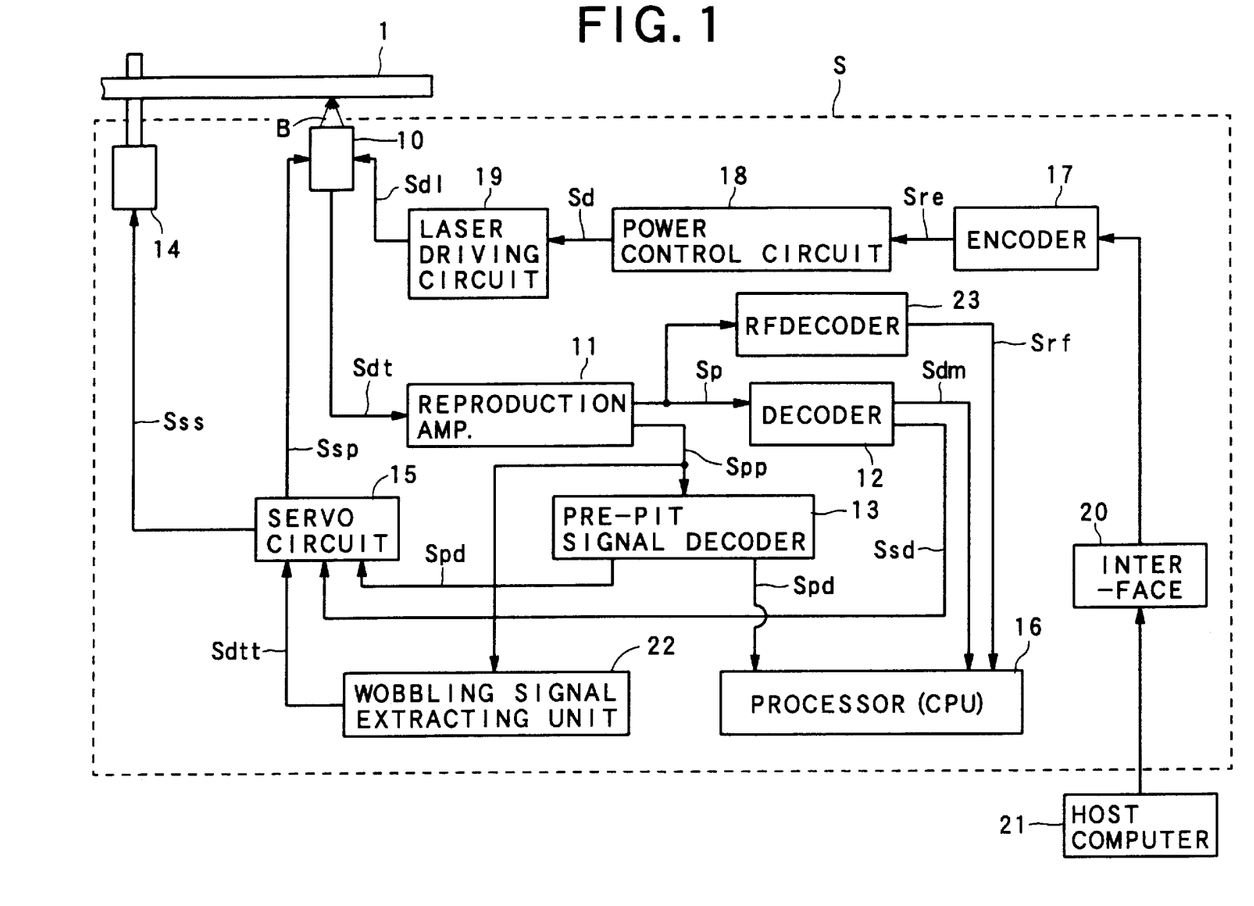
FIG. 1 is a block diagram of an information recording apparatus as an embodiment of the present invention.

FIG. 1 shows a whole structure of an information recording apparatus of the embodiment.

In FIG. 1, an information recording apparatus S is provided with an optical pickup 10, a reproduction amplifier 11, a decoder 12, a pre-pit signal decoder 13, a spindle motor 14, a servo circuit 15, a processor 16, an encoder 17, a power control circuit 18, a laser driving circuit 19, an interface 20, a wobbling signal extracting unit 22 and an RF (Radio Frequency) detector 23. Into the information recording apparatus S, digital information to be recorded is inputted from an external host computer 21 connected to the interface 20.

In the above mentioned structure, the optical pickup 10 includes a laser diode, a polarization beam splitter, an objective lens, a light detector and so on. The optical pickup 10 irradiates the information record surface of an DVD-RW 1 with a light beam B on the basis of a laser driving signal Sdl, and reads out the digital information which has been already recorded on the information record surface by detecting the reflection light of the light beam B.

The reproduction amplifier 11 amplifies a detection signal Sdt outputted from the optical pickup 10 and outputs an amplified signal Sp corresponding to the recorded digital information and a pre-pit signal Spp corresponding to the pre-pit.

The decoder 12 decodes the amplified signal Sp by applying an 8–16 decoding process and a de-interleave process onto the amplified signal Sp, and outputs a decoded signal Sdm and a servo-decoded signal Ssd.

The pre-pit signal decoder 13 decodes the pre-pit signal Spp and outputs the decoded pre-pit signal Spd by decoding the pre-pit signal Spp.

The servo circuit 15 outputs a pickup servo signal Ssp for a focus servo control and a tracking servo control of the optical pickup 10 on the basis of the decoded pre-pit signal Spd and the servo decoded signal Ssd. Further, the servo circuit 15 outputs a spindle servo control signal Sss to control the rotation of the spindle motor 14 on the basis of an extracted signal Sdtt.

The processor 16 totally controls a whole portion of the information recording apparatus S. The processor 16 also obtains the decoded signal Sdm outputted from the decoder 12, the decoded pre-pit signal Spd outputted from the pre-pit signal decoder 13 and the RF detection signal Srf outputted from the RF detector 23, so as to control the writing process and the reproducing process for the DVD-RW 1.

The encoder 17 includes an ECC generator, an 8–16 decoding unit, a scrambler etc., constitutes an ECC block which is an error correction unit upon reproducing and generates an encoded signal Sre by applying the interleave process, the 8–16 decoding process and the scramble process to this ECC block, on the basis of the digital information.

The power control circuit 18 outputs the record signal Sd to control the output of the laser diode in the optical pickup 10, on the basis of the encoded signal Sre.

The laser driving circuit 19 outputs the laser driving signal Sdl to actually drive the laser diode in the optical pickup 10 so as to emit the light beam B, on the basis of the record signal Sd.

The interface 20 performs an interface process to take in the digital information, which is transmitted from the host computer 21, into the information recording apparatus S and outputs the digital information, which has been already taken into the encoder 17.

The wobbling signal extracting unit 22 extracts a wobbling signal of a groove track, which is included in the pre-pit signal Spp, and outputs the extracted signal Sdtt to the servo circuit 15.

The RF detector 23 outputs the RF detection signal Srf which is modulated by a pit array on the basis of the amplified signal Sp outputted from the reproduction amplifier 11, so as to identify the formation of the pit array.

Figure 2:
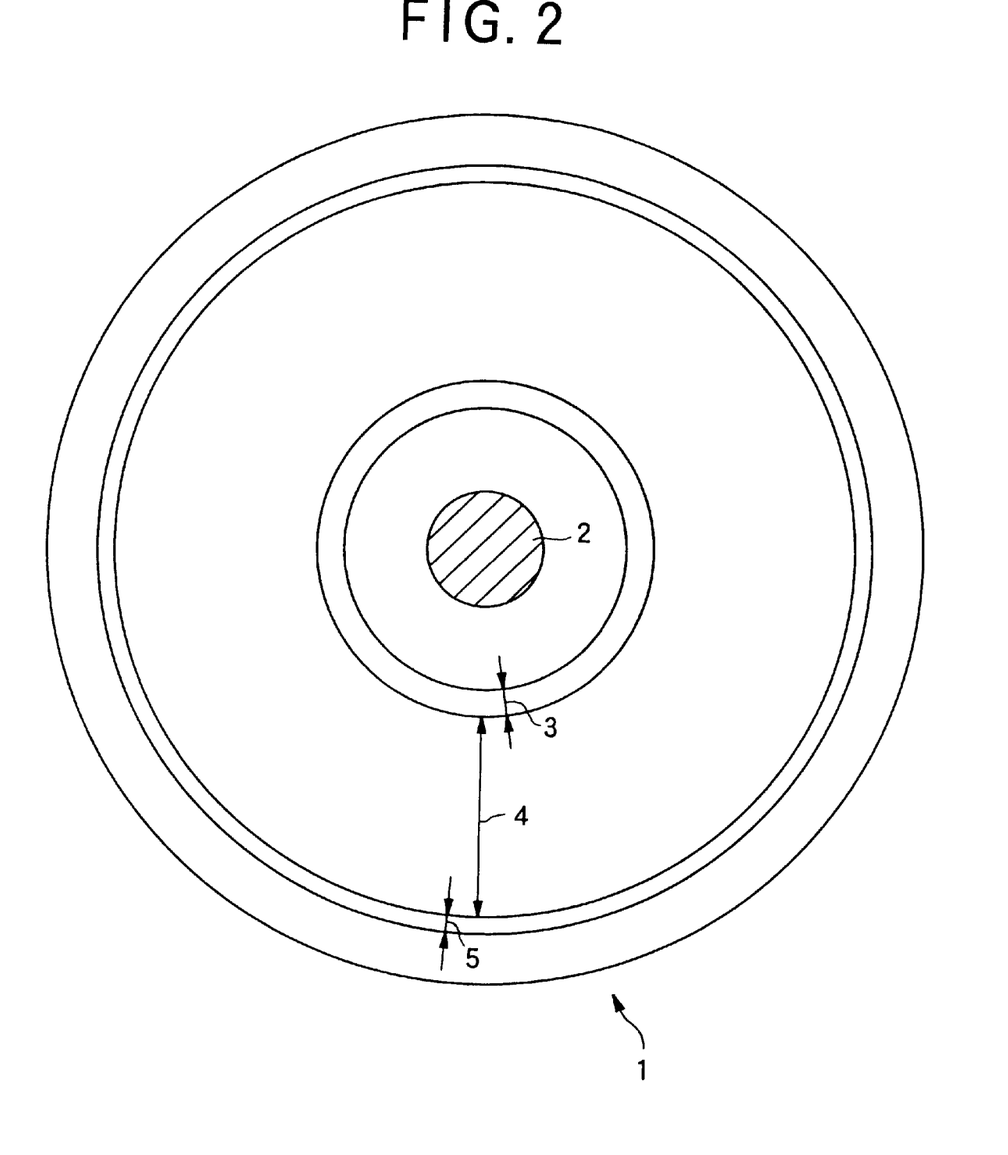
FIG. 2 is a schematic plane view of a DVD-RW in the embodiment of FIG. 1.

Next, FIG. 2 shows a structure of the information record surface of the DVD-RW 1.

As shown in FIG. 2, in the information record surface of the DVD-RW 1, a clamp hole 2 for fixing the DVD-RW 1 to a damper of the information recording apparatus S when the DVD-RW 1 is rotated is formed at a center thereof, and a lead in area 3, a data area 4 and an lead out area 5 are disposed around the clamp hole 2 from the central portion in this order. In each of those areas, a pit array is formed in the groove track to be recorded and reproduced, and the pre-pit is formed on a land track corresponding to it.

In the above mentioned structure, the lead in area 3 is an area, which is ahead of the data area 4 where the data corresponding to the actual contents is recorded and which is firstly accessed upon recording and reproducing. In this lead in area 3, the information indicating that it is the lead in area 3, the information related to the pertinent DVD-RW 1, various information related to the record data corresponding to the contents and so on are recorded. The more-detailed structure of the lead in area 3 will be described later.

The data area 4 is an area where the data corresponding to the contents is recorded. Video data, audio data, data or program data readable by a computer are recorded in the data area 4.

The lead out area 5 is an area which is behind the data area 4. In the lead out area 5, the information indicating that it is the lead out area 5 is also recorded.

Figure 3:
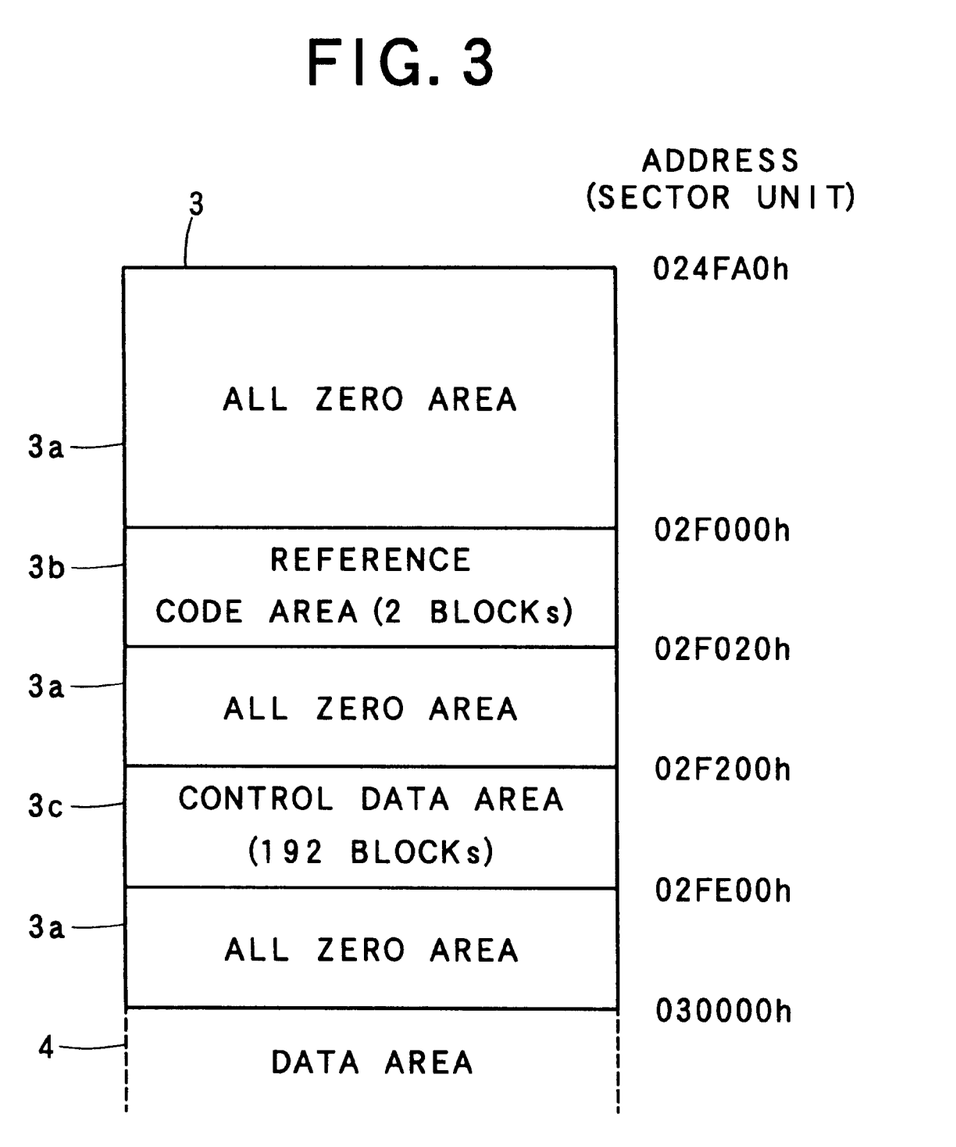
FIG. 3 is a diagram showing a data structure of a lead in area of the DVD-RW of FIG. 2.

Next, FIG. 3 shows the data structure of the lead in area 3 of the DVD-RW 1. In FIG. 3, the data is divided by a unit of a "sector", and is formed in line with the format of assigning the address for each sector. The lead in area 3 constitutes one ECC block for each 16 sector, which becomes also one unit block in the error correction process. In FIG. 3, the number "h" at the end of each address (sector unit) means "hexadecimal".

As shown in FIG. 3, the lead in area 3 is an area in the range from 24FA0 h at the head address to 2FFFF h (which is just before 30000 h in FIG. 3) at the end address. The data area 4 starts from the address 30000 h. In FIG. 3, all zero area 3a is included in the lead in area 3, which is recorded by setting zero to all of the pit arrays. Between two of the all zero areas 3a, there is a reference code area 3b in the range from the address 2F000 h to the address 2F01F h, where a specific pit pattern is recorded for performing the scramble process. Between two of the all zero areas 3a, there is a control data area 3c in the range from the address 2F200 h to the address 2FDFF h.

In the initializing process of the present embodiment, a writing process is performed with respect to the control data area 3c. The control data area 3c consists of 193024 sectors in total and includes 192 ECC blocks, since the head address thereof is 2F200 h and the end address thereof is 2FDFF h as mentioned before. Then, in each ECC block, the physical format information and the disc production information are described. Incidentally, these physical format information and the disc production information are repeatedly described in all of the ECC blocks as the same content. Namely, the same information are continuously recorded by 192 times.

In the physical format described in each of the ECC blocks of the control data area 3c, there is included the data area arrangement information. Then, as one of the data area arrangement information, there is a Last Recorded Address as a last or end record address where the last data was recorded at the latest recording process. Namely, in this Last Recorded Address, the address which is the maximum in the range of the data previously recorded in the data area 4 is described. A specific address within the range of the data area 4 is generally described in this Last Recorded Address. Although the actual address (i.e., the address number) of this Last Recorded Address varies as the condition varies, it certainly becomes a value greater than 30000 h after writing the data. Therefore, in the present embodiment, a predetermined value smaller than 30000 h which is the predetermined head address of the data area 4 is written to the Last Recorded Address at the initializing process. This process will be described later in detail.

Incidentally, the predetermined address value written into the Last Recorded Address along with the initializing process is any value as long as it is not greater than 30000 h. For example, it may be determined to the value of 2FFFF h.

Figure 4:
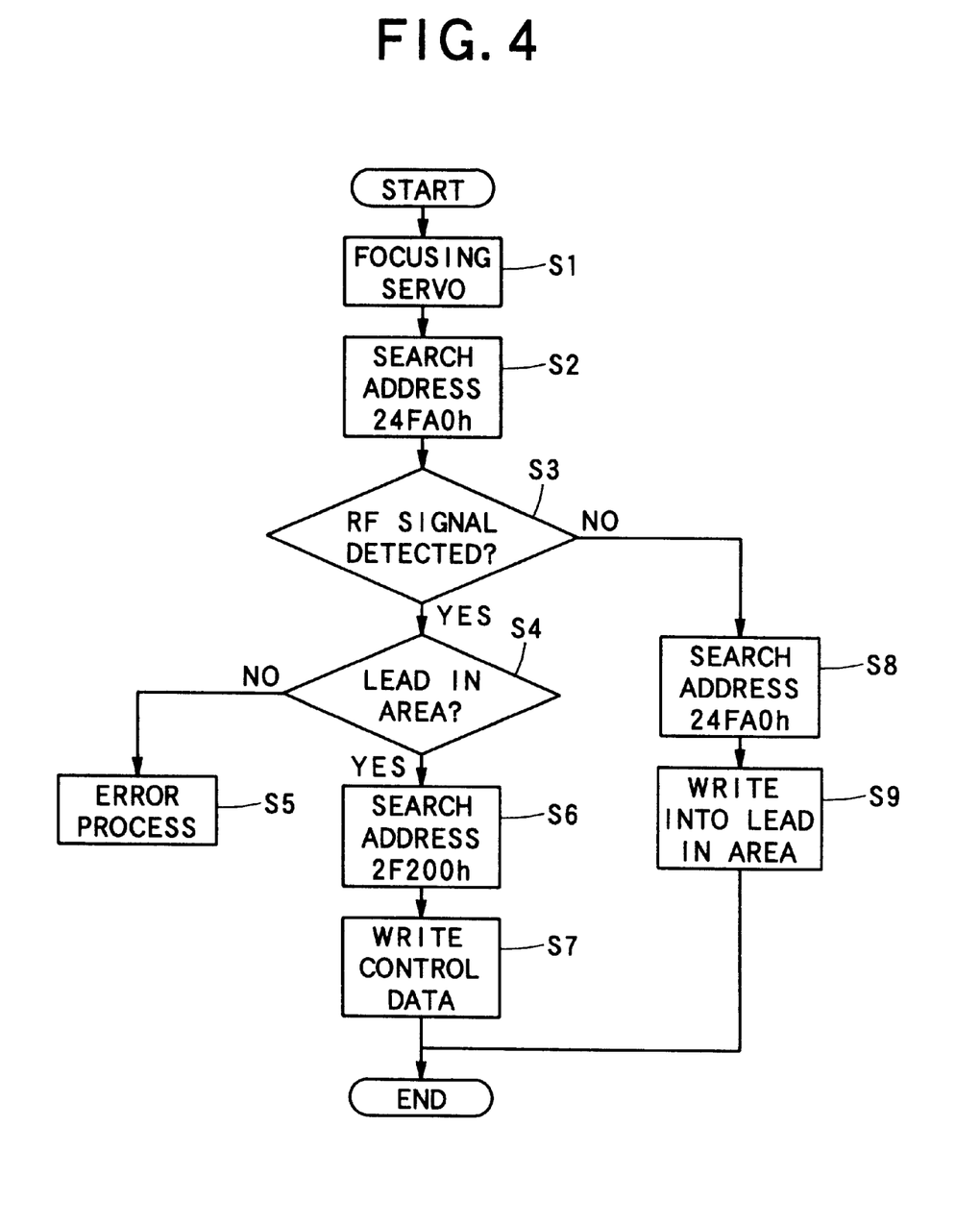
FIG. 4 is a flow chart indicating an initializing process performed by the information recording apparatus of FIG. 1.

Next, FIG. 4 shows the initializing process performed by the information recording apparatus S of the present embodiment.

As shown in FIG. 4, when the initializing process is started with respect to the DVD-RW 1 to be initialized, at first, the focusing servo is actuated at a step S1. Namely, the beam waist of the light beam B on the information record surface of the DVD-RW1 irradiated from the optical pickup 10 is kept in a predetermined range, so as to enable reading and writing the data in a stable manner.

In a step S2, a search operation is performed with respect to the address 24FA0 h which is the head position of the lead in area 3 on the DVD-RW 1 as a target. By this, the optical pickup 10 is moved to the target position in a radial direction on the DVD-RW 1 so that it becomes possible to read and write the data in the lead in area 3.

In a step S3, it is judged whether or not there exists the RF detection signal Srf outputted from the RF detector 23. Namely, in case that the RF detection signal Srf is recognized, it is possible to judge that the pit array is formed on the DVD-RW 1 and some writing process has ever been applied beforehand to the disc. On the other hand, if the RF detection signal Srf is not recognized, it is possible to judge that the pit array is not formed on the DVD-RW 1, the information record surface is the mirror finished surface, and the disc is a nonrecorded disc.

As a result of the judgment at the step S3, if the RF detection signal Srf is recognized (step S3: YES), the operation flow branches to a step S4. On the other hand, as a result of judgment at the step S3, if the RF detection signal Srf is not recognized (step S3: NO), the operation flow branches to a step S8.

In the step S4, it is judged whether or not the reading data from the DVD-RW1 corresponds to the lead in area 3. Namely it is considered that, although the search is performed with respect to the head of the lead in area 3 at the step S2, the position may be shifted due to an influence of an external disturbance to the optical pickup 10 afterward.

As a result of the judgement at the step S4, if the optical pickup 10 is presently positioned in the lead in area 3 (step S4: YES), the operation flow proceeds to a step S6. On the other hand, as a result of the judgment at the step S4, if the optical pickup 10 is not positioned in the lead in area 3 but is positioned in another area (step S4: NO), an appropriate error process is performed at a step S5 since the initializing process cannot be performed. This error process may be performed appropriately for the position of the optical pickup 10 or the like.

In the step S6, the search operation is performed with respect to the address 2F200 h, which is the head position of the control data area 3c in the lean in area 3 of the DVD-RW 1, as a target. By this, the preparation for writing the data to the control data area 3 is completed.

In a step S7, a writing process to the control data area 3c in a predetermined format is performed. At this time, the writing process is performed such that the Last Recorded Address in the control data area 3c is set as a predetermined address value smaller than the address value of 30000 h, which is the head position of the data area 4. By this, in case of reading the Last Recorded Address at the time of reproducing the data after the initializing process, it can be recognized that the data is not recorded in the data area 4.

On the other hand, in case that the operation flow branches from the step S3 to the step S8, in the step S8, the search operation is performed again with respect to the address 24FA0 h, which is the head position of the lead in area 3 on the DVD-RW 1, as a target. By this, the preparation for writing the data with respect to the lead in area 3 can be completed.

In a step S9, the writing process to all of the lead in area 3 including the control data area 3c in a predetermined format is performed. Namely, although the data is written only to the control data area 3c in the step S7, in the step S9 in contrast, the data is written in a predetermined format since the DVD-RW 1 is non-recorded disc and no pit is formed in the lead in area 3. Then, in the same manner as the step S7, the Last Recorded Address in the control data area 3c is written as a predetermined address value smaller than the address 30000 h which is the head position of the data area 4.

When the process at the step S7 or the step S9 is finished, the initializing process for the DVD-RW 1 to be initialized is finished, it becomes possible to perform a new writing process with respect to the pertinent DVD-RW 1 from now on.

Figure 5:
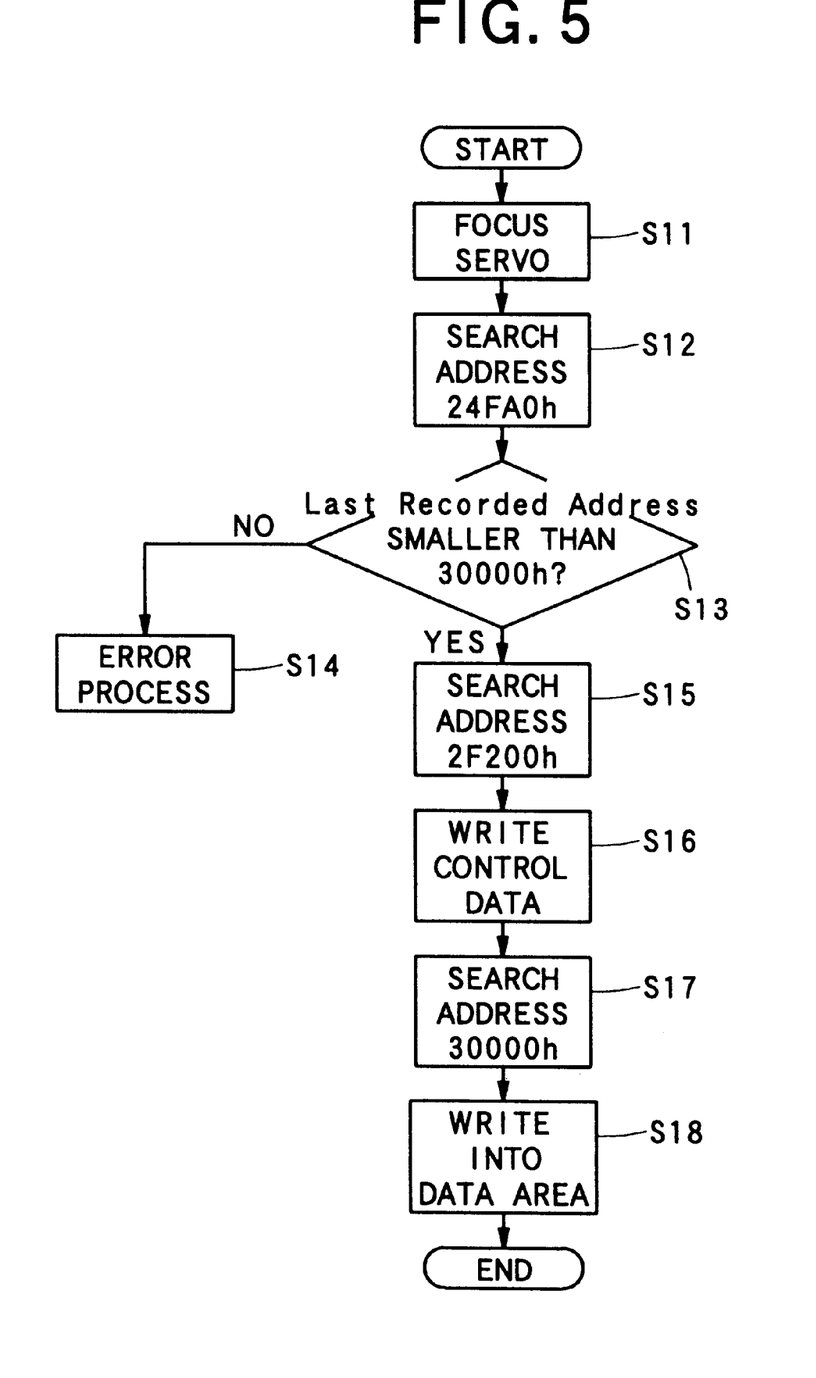
FIG. 5 is a flow chart indicating a writing process performed by the information recording apparatus of FIG. 1.

Next, FIG. 5 is a flow chart showing the writing process performed by the information recording apparatus S of the present embodiment.

As shown in FIG. 5, when the data writing process is started with respect to the DVD-RW 1 to which the initializing process has been completed, the focusing servo is actuated at a step S11. Namely, the beam waist of the light beam B on the information record surface of the DVD-RW 1 irradiated from the optical pickup 10 is kept in a predetermined range, so as to enable writing the data in a stable manner.

In a step S2, a search operation is performed with respect to the address 24FA0 h which is the head position of the lead in area 3 on the DVD-RW 1 as a target. By this, the optical pickup 10 is moved to the target position in a radial direction on the DVD-RW 1 so that it becomes possible to read and write the data in the lead in area 3.

In a step S13, it is judged whether or not the Last Recorded Address included in the control data area 3c is smaller than 30000 h. Namely, in case that the initializing process with respect to the DVD-RW 1 is performed in accordance with the flow chart of FIG. 4, a value smaller than 30000 h is supposed to be set at this Last Recorded Address. In contrast, in case that a further writing process is performed after the initializing process, a predetermined value larger than 30000 h by the amount of the written data is supposed to be set to the Last Recorded Address. Thus, these cases are identified.

Then, as a result of the step S13, if the Last Recorded Address is smaller than 30000 h (step S13: YES), the operation flow proceeds to a step S15. On the other hand, if the Last Recorded Address is not smaller than 30000 h (step S13: NO), an appropriate error process is performed at a step S14 since the writing process has been already performed after the initializing process at a step S14. This error process may be performed appropriately for the operating condition or the like.

In the step S15, the search process is performed with respect to the address 2F200 h, which is the head position of the control data area 3c in the lead in area 3 of the DVD-RW 1, as a target. By this, the preparation for writing the data to the control data area 3c is completed.

In the step S16, the writing process to the control data area 3c is performed. At this time, under the assumption that the data size of the contents to be written to the data area 4 is grasped in advance, the value which becomes the last or end address of the data area 4 obtained on the basis of the data size is written to the Last Recorded Address. By this, in case of reading the Last Recorded Address at the reproducing process after the writing process, it is recognized that the contents in a predetermined data size is recorded in the data area 4.

In a step S17, the search operation is performed with respect to the address 30000 h which is the head position of the data area 4 on the DVD-RW 1, as a target. By this, the preparation for writing the data corresponding to the contents into the data area 4 is completed.

In a step S18, the data corresponding to the contents to be actually recorded is written into the data area 4 of the DVD-RW 1. The data is recorded in the range from the address 30000 h to the address value which is written as the Last Recorded Address.

When the process in the step S18 is ended, the writing process with respect to the DVD-RW 1 after the initializing process is ended. Thus, when the reproducing process is performed with respect to the pertinent DVD-RW 1, the recorded contents can be read out and reproduced.

In this manner, according to the information recording apparatus S of the present embodiment, when performing the initializing process with respect to the DVD-RW 1, a value smaller than 30000 h, which is the head address of the data area 4, is written to the Last Recorded Address included in the control data area 3c in the lead in area 3. Therefore, after the initializing process, when performing the recording process and the reproducing process with respect to the DVD-RW 1, if the Last Recorded Address is read, it is possible to judge that the initializing process has been performed to the pertinent disc but no data has been written in the data area 4. By this, it is possible to prevent the DVD-RW 1, on which no data is written, from being erroneously reproduced, and it is also possible to prevent the DVD-RW 1, on which the data has been already recorded, from being erroneously over-written. Then, in the initializing process, it is possible to omit the process of writing the zero data so as to form the pits with respect to the data area 4 of the DVD-RW 1. Thus, it is possible to avoid the increase of the time required for the initializing process along with the writing process of the zero data in the large data amount. Therefore, it is possible to finish speedily the initializing process with respect to the DVD-RW 1 and it is also possible to start the next process promptly by the information recording apparatus S.

In the above described embodiment, the present invention is applied to the case in which the digital data is recorded onto the DVD-RW 1. However, other than such an application, it is possible to widely apply the present invention to various information recording apparatuses, each of which performs the initializing process by a predetermined format with respect to the information record medium capable of repeatedly recording the record data thereon, and holds and manages the address information of the data area.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-037721 filed on Feb. 19, 1998 including the specification, claims, drawings and summary is incorporated herein by reference in its entirety.

What is claimed is:

1. An information recording apparatus for initializing an information record medium of repeatedly recordable type, on which at least a lead in area and a data area following the lead in area are assigned in accordance with a predetermined format, and recording record information onto the initialized information record medium, and further recording the record information onto the initialized and recorded information record medium, the record information comprising data information in the data area as main portion of the record information to be recorded and control information in the lead in area for controlling recording and reproducing operation of the data information, the control information including a last recorded address indicating an address in the data area of a last portion of the data information which is previously recorded by the recording operation, said apparatus comprising:

a writing device for writing the data information into the data area and the control information into the lead in area; and a controlling device for controlling said writing device to write a predetermined address smaller than a head address of the data area as the last recorded address into the lead in area as one portion of the control information when initializing the information record medium, and to write the data information into the data area and the last recorded address into the lead in area as one portion of the control information when recording the record information.

2. An information recording apparatus according to claim 1, further comprising:

a reading device for reading the control information from the lead in area when recording the record information onto the initialized information record medium; and a judging device for judging whether or not the last recorded address included in the read control information is smaller than the head address, said controlling device calculates the last recorded address on the basis of a data size of the data information to be recorded, and controls said writing device to write the calculated last recorded address into the lead in area as one portion of the control information if the last recorded address included in the read control information is judged to be smaller than the head address.

3. An information recording apparatus according to claim 2, wherein said controlling device performs a predetermined error process if the last recorded address included in the read control information is judged to be not smaller than the head address.

4. An information recording apparatus according to claim 2, wherein said controlling device controls said writing device to write the data information from the head address of the data area if the last recorded address included in the read control information is judged to be smaller than the head address.

5. An information recording apparatus according to claim 1, further comprising a reading device for reading the control information from the lead in area when recording the record information onto the initialized and recorded information record medium, said controlling device controlling said writing device to write the data information into the data area from an address after the last recorded address included in the read control information.

6. An information recording apparatus according to claim 1, wherein said information record medium comprises a DVD Rewritable, and said controlling device controls said writing device to write the predetermined address smaller than 30000 (hexadecimal) as the last recorded address.

7. An information recording method of initializing an information record medium of repeatedly recordable type, on which at least a lead in area and a data area following the lead in area are assigned in accordance with a predetermined format, and recording record information onto the initialized information record medium, and further recording the record information onto the initialized and recorded information record medium, the record information comprising data information in the data area as main portion of the record information to be recorded and control information in the lead in area for controlling recording and reproducing operation of the data information, the control information including a last recorded address indicating an address in the data area of a last portion of the data information which is previously recorded by the recording operation, said method comprising:

a writing process of writing the data information into the data area and the control information into the lead in area; and a controlling process of controlling said writing process to write a predetermined address smaller than a head address of the data area as the last recorded address into the lead in area as one portion of the control information when initializing the information record medium, and to write the data information into the data area and the last recorded address into the lead in area as one portion of the control information when recording the record information.

8. An information recording method according to claim 7, further comprising:

a reading process of reading the control information from the lead in area when recording the record information onto the initialized information record medium; and a judging process of judging whether or not the last recorded address included in the read control information is smaller than the head address, said controlling process calculates the last recorded address on the basis of a data size of the data information to be recorded, and controls said writing process to write the calculated last recorded address into the lead in area as one portion of the control information if the last recorded address included in the read control information is judged to be smaller than the head address.

9. An information recording method according to claim 8, wherein said controlling process performs a predetermined error process if the last recorded address included in the read control information is judged to be not smaller than the head address.

10. An information recording method according to claim 8, wherein said controlling process controls said writing process to write the data information from the head address of the data area if the last recorded address included in the read control information is judged to be smaller than the head address.

11. An information recording method according to claim 7, further comprising a reading process of reading the control information from the lead in area when recording the record information onto the initialized and recorded information record medium, said controlling process controlling said writing process to write the data information into the data area from an address after the last recorded address included in the read control information.

12. An information recording method according to claim 7, wherein said information record medium comprises a DVD Rewritable, and said controlling process controls said writing process to write the predetermined address smaller than 30000 (hexadecimal) as the last recorded address.

* * * * *